(12) United States Patent
Moehwald et al.

(10) Patent No.: US 8,609,789 B2
(45) Date of Patent: Dec. 17, 2013

(54) OLIGOMERIC AND POLYMERIC AROMATIC PHOSPHONIC ACIDS, THEIR BLENDS, PROCESSES FOR PREPARING THEM AND USES AS POLYELECTROLYTES

(75) Inventors: Helmut Moehwald, Annweiler (DE); Thorsten Bock, Freiburg (DE); Rolf Muelhaupt, Freiburg (DE)

(73) Assignee: BASF SE, Ludwigshafen (DE)

( * ) Notice: Subject to any disclaimer, the term of this patent is extended or adjusted under 35 U.S.C. 154(b) by 1002 days.

(21) Appl. No.: 12/279,794

(22) PCT Filed: Feb. 12, 2007

(86) PCT No.: PCT/EP2007/051343
§ 371 (c)(1),
(2), (4) Date: Aug. 18, 2008

(87) PCT Pub. No.: WO2007/093577
PCT Pub. Date: Aug. 23, 2007

(65) Prior Publication Data
US 2009/0017360 A1    Jan. 15, 2009

(30) Foreign Application Priority Data

Feb. 16, 2006  (EP) .................... 06110069

(51) Int. Cl.
*C08F 32/00* (2006.01)
*C08F 32/04* (2006.01)
*C08F 132/04* (2006.01)

(52) U.S. Cl.
USPC ........................................ 525/535

(58) Field of Classification Search
USPC ............... 525/534, 535, 538; 528/391, 398; 429/33
See application file for complete search history.

(56) References Cited

U.S. PATENT DOCUMENTS

| | | | | |
|---|---|---|---|---|
| 3,051,740 | A * | 8/1962 | Abramo et al. | 558/124 |
| 3,262,892 | A * | 7/1966 | Hay | 521/30 |
| 3,748,306 | A * | 7/1973 | Khattab | 528/167 |
| 6,828,407 | B2 * | 12/2004 | Sasaki et al. | 528/86 |
| 2004/0062969 | A1 | 4/2004 | Sakaguchi et al. | |
| 2004/0138352 | A1 * | 7/2004 | Taniguchi et al. | 524/115 |
| 2006/0008690 | A1 * | 1/2006 | Uensal et al. | 429/33 |
| 2008/0207822 | A1 * | 8/2008 | Yeager et al. | 524/543 |

FOREIGN PATENT DOCUMENTS

| | | |
|---|---|---|
| DE | 103 55 619 | 6/2004 |
| EP | 1 354 907 | 10/2003 |
| WO | WO 2004/033079 | 4/2004 |
| WO | WO 2006/018020 * | 2/2006 |

OTHER PUBLICATIONS

Lafitte, Journal of Polymer Science Part A: Polymer Chemistry, vol. 43, issue 2, p. 273-286 (2004).*
Kenj Miyatake et al., "New Poly(arylene ether)s with Pendant Phosphonic Acid Groups", Journal of Polymer Science:Part A: Polymer Chemistry, vol. 39, 3770-3779 (2001).
K. Issleib, et al., "Synthese von Aryl-bis(trimethylsilyl)-phosphonsaureestern via Tris-trimethylsilylphosphit—Ein Beitrag zur nickel-katalysierten Michaelis-Arbusov-Reaktion", Z. anorg. allg.Chem. 529 (1985) 151-156.
Spiro D. Alexandratos, et al., "Synthesis and Characterization of Bifunctional Phosphinic Acid Resins", Macromolecules, vol. 18, No. 5, May 1985.
Leon Freedman, et al., J. Org. Chem., Communications, vol. 26, 284-285, Jan. 1961.
Peter Travs, "Reaktion von Arylhalogeniden mit Trialkylphosphiten und Benzol-phosphonigsaure-dialkylestern zu aromatischen Phosphonsaureestern und Phosphinsaureestern unter Nickelsalzkatalyse", Aromatische Phosphonsaureester und Phosphinsaureester, Chem. Ber. 103, 2428-2436 (1970).
Kai Jakoby et al., "Palladium-Catalyzed Phosphonation of Polyphenylsulfone", Macromol. Chem. Phys. 2003, 2004 No. 1, 61-67.
L. S. Liebeskind, Reaction of o-Diiodobenzene with Alkynes and Nickel Carbonyl. Synthesis of Substituted Indenones, J. Org. Chem. vol. 45, No. 26, 1980, 5426-5429.
Benoît Lafitte, et al., "Phosphonation of Polysulfones via Lithiation and Reaction with Chlorophosphonic Acid Esters", Journal of Polymer Science: Part A: Polymer Chemistry, vol. 43, 273-286 (2005).

* cited by examiner

*Primary Examiner* — Robert C Boyle
(74) *Attorney, Agent, or Firm* — Oblon, Spivak, McClelland, Maier & Neustadt, L.L.P.

(57) ABSTRACT

The present invention relates to halogen-free, oligomeric or polymeric phosphonic acids made up of units of the general formula (I)

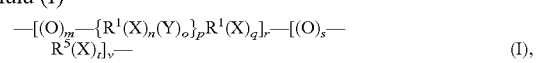

where:

| | |
|---|---|
| X | is $-P=O(OH)_2$, |
| Y | is carbonyl or sulfonyl, |
| $R^1, R^5$ | are, independently of one another, divalent or polyvalent, substituted or unsubstituted, heteroatom-free or heteroatom-comprising aromatic radicals, |
| m, o, s | are each, independently of one another, 0 or 1, |
| n, q, t | are each, independently of one another, 0 or an integer from 1 to 8, with n and s not simultaneously being 0, |
| r, v | are each, independently of one another, from 0 to 1, with the sum of r and v being from 0.95 to 1.05, and |
| p | is 0 or an integer $\geq 1$, | where the radicals X are substituents on $R^1$ and $R^5$ and the radicals Y are parts of polymer or oligomer chain, to a process for preparing these compounds and also to halogen-free mixtures comprising one or more compounds of the general formula (I) and a nitrogen-free solvent having a boiling point of >150° C.

18 Claims, No Drawings

OLIGOMERIC AND POLYMERIC AROMATIC PHOSPHONIC ACIDS, THEIR BLENDS, PROCESSES FOR PREPARING THEM AND USES AS POLYELECTROLYTES

The present invention relates to a process for preparing halogen-free aromatic polyphosphonic acids which are suitable for use in polyelectrolyte membranes, halogen-free, high-purity polyphosphonic acids and also membranes produced from these high-purity polyphosphonic acids.

The preparation of polyaromatic compounds whose recurring monomer units are substituted with phosphonic esters can be achieved by direct copolymerization of monomers comprising phosphonic acid functions with further monomers or by polymer-analogous reactions to introduce the phosphonic acid function. Since phosphonic acids and their derivatives generally have a strong adverse effect on the polycondensation reactions in the synthesis of polyaryls, polyaryl ether ketones and polyaryl ether sulfones, the polymer-analogous reaction is preferred.

The Friedel-Crafts-analogous reaction of activated aromatics with $PCl_3$ and Lewis acids such as $AlCl_3$ to form aromatic phosphonous dichlorides which has been studied for low molecular weight and polymeric substrates gives phosphonic-acid aromatics after hydrolysis/oxidation. However, crosslinking secondary reactions due to the electrophilicity of the phosphonous dichloride Ar—$PCl_2$ initially formed are unavoidable. Corresponding processes are disclosed in J. Org. Chem., 1961, 26, 284, Macromol. 1985, 18, 5, 829-835 or U.S. Pat. No. 3,748,306. Owing to the significant degree of crosslinking, this process is unsuitable for the synthesis of polymers to be processed by casting or thermoplastic methods.

J. Poly. Sc. Part A: Poly. Chem. 2004, 43(2), 273-286 describes the activation of low molecular weight and polymeric aromatic substrates toward halogen-comprising phosphorus reagents by means of organometallic reagents, e.g. lithiation of the aromatic. However, the phosphonic ester groups introduced on reaction of metalated polymers with dialkyl chlorophosphonates are likewise capable of undergoing nucleophilic substitutions with metalated carbanions. This situation leads, even with careful reaction control, to insoluble products due to crosslinking secondary reactions above degrees of functionalization of 50 mol %.

The desired highly functionalized polyphosphonic acids can thus not be obtained in a form which can be processed by casting or thermoplastically by metalation/phosphonylation.

Aromatic phosphonylations catalyzed by palladium and nickel catalysts proceed without crosslinking as a result of the type of reaction. Here, halogenated aromatic starting materials are reacted with trialkyl phosphites over Pd(0), Pd(II), or Ni(0) or Ni(II) to form aromatic dialkyl phosphonates. Both processes are known for the synthesis of low molecular weight phosphonoaromatics from Chem. Ber. 1970, 103, 2428-2436, and J. Org. Chem. 1980, 45, 5426-5429, and have only recently been examined for use in polymer-analogous syntheses. Processes for palladium- and nickel-catalyzed phosphonylation of polymers are disclosed in Macromol. Chem. Phys. 2003, 204, 61-67, J. Poly. Sci. A: Poly. Chem. 2001, 39 3770-3779, and U.S. Pat. No. 6,828,407.

J. Poly. Sci. A: Poly. Chem. 2001, 39, 3770-3779, discloses that polymeric dialkyl phosphonates can be obtained Pd-catalytically without residual halogenated precursors only by use of half-stoichiometric amounts of Pd catalyst, based on the amount of bromine to be reacted.

Macromol. Chem. Phys. 2003, 204, 61-67, discloses that only partially halogenated products which are unstable under fuel cell conditions can be obtained when using a catalyst/bromine ratio below 50 mol %. Thus, only mono-brominated product having a degree of phosphonylation of 88 mol % could be prepared from dibrominated poly(phenyl sulfone) RADEL® R5000 when using 2.5 mol % of Pd catalyst.

A further disadvantage of the Pd- or Ni-catalyzed addition of phosphonic esters is that the desired phosphonic acids have to be set free from the dialkyl phosphonates in a further ester cleavage step which has to be carried out separately.

The Ni(II)-catalyzed process for obtaining aromatic polyphosphonic esters which is disclosed in U.S. Pat. No. 6,828,407 uses quantitative to three times quantitative amounts of catalyst, based on the bromine content to be reacted, in various amide solvents. Thus, according to the above patent publication, a polymer having a degree of phosphonylation of 137 mol % and a residual bromine content of 16 mol % can be obtained from dibrominated poly(phenyl sulfone) RADEL R5000 by reaction with alkyl phosphites in N,N-dimethylformamide solution. The preparation of aromatic polyphosphonic esters is restricted to alkyl esters.

The haloalkanes eliminated in the nickel-catalyzed oxidative addition of a trialkyl phosphite onto a haloaromatic are likewise able to undergo a Michaelis-Arbuzov reaction with the trialkyl phosphite, which can lead to product mixtures and a reduced yield, according to Chem. Ber. 1970, 103, 2428-2436, and Z. anorg. allgem. Chem., 529, 151-156, 1985. Such a secondary reaction is effectively suppressed by the use of silylated phosphorus(III) components which is described here, since the silylphosphorus halides eliminated here are, unlike haloalkanes, inert under the reaction conditions.

The reaction is carried out in N-comprising solvents, very particularly preferably N,N-dimethylformamide at reflux temperatures of 153° C. Under these reaction conditions, only bromine groups on electron-rich ether segments react. The less reactive bromine-substituted rings adjacent to the $SO_2$ or CO group are not reacted, which is why polymers made up only of such rings (e.g. ULTRASON® E, poly(4-sulfonylphenoxylene) cannot be reacted by this process. The phosphonylation of polymers by means of silylated phosphorous acid, e.g. $P(OSiMe_3)_3$, is described for low molecular weight syntheses in Zeitschrift für anorganische und allgemeine Chemie, 529(10), 1985, 151-156, but was not used for the polymer synthesis.

The subsequent cleavage of the resulting polymeric dialkyl phosphonate by use of silyl halides such as trimethylsilyl iodide is described in U.S. Pat. No. 6,828,407 B2, but leads to a halogen-comprising mixture of silylated polyphosphonic acids and alkyl halide, in particular iodoalkyls which are difficult to separate off and lead to contamination.

The processes for the polymer-analogous direct phosphonylation of aromatic systems which are known from the literature have process-inherent disadvantages in respect of crosslinking secondary reactions, incompleteness of conversion, amount of catalyst to be used and removal of catalyst residues. Furthermore, hydrogen halides are formed from halogen-comprising impurities and unreacted residues of the haloaryl precursors when the polymers are used as membrane in fuel cells as a result of reaction of hydrogen over Pt catalysts during operation of the fuel cell and these can, as strong acids, cause corrosion of the cell. In addition, unforeseeable changes in the membrane properties, e.g. swelling behavior, mechanical strength, due to dehydrohalogenation are possible.

It is an object of the present invention to provide halogen-free, oligomeric or polymeric aromatic phosphonic acids. Furthermore, it is an object of the present invention to provide a process for preparing these halogen-free, oligomeric or polymeric phosphonic acids which does not have the disadvantages known from the prior art in respect of crosslinking secondary reactions, completeness of conversion, amount of catalyst to be used, halogen-comprising impurities, removal of catalyst residues. Furthermore, the amount of catalyst to be used should be very small.

Further objects of the present invention are to provide oligomeric and polymeric silylated aromatic phosphonic acids from which the halogen-free, oligomeric or polymeric phosphonic acids are formed without an additional chemical phosphoric ester cleavage step to be carried out separately, and also blends comprising these oligomeric and polymeric, aromatic phosphonic acids.

The objects mentioned are achieved by halogen-free, oligomeric or polymeric phosphonic acids made up of units of the general formula (I)

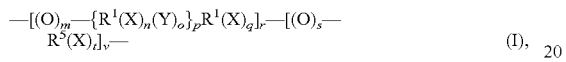

where:

| | |
|---|---|
| X | is —P=O(OH)$_2$, |
| Y | is carbonyl or sulfonyl, |
| R$^1$, R$^5$ | are, independently of one another, divalent or polyvalent, substituted or unsubstituted, heteroatom-free or heteroatom-comprising aromatic radicals, |
| m, o, s | are each, independently of one another, 0 or 1, |
| n, q, t | are each, independently of one another, 0 or an integer from 1 to 8, with n and s not simultaneously being 0, |
| r, v | are each, independently of one another, from 0 to 1, with the sum of r and v being from 0.95 to 1.05, and |
| p | is 0 or an integer ≥1, | where the radicals X are substituents on R$^1$ and R$^5$ and the radicals Y are parts of a polymer or oligomer chain.

For the purposes of the present invention, "halogen-free" means a halogen content of less than 1% by weight, preferably less than 0.5% by weight, particularly preferably less than 0.3% by weight, in each case based on the mass of phosphonylated product.

These compounds are aromatic or semiaromatic polymers in which X and Y are bound to aromatic radicals, with X being a substituent on the aromatic parts of the polymer and Y being present in the polymer chain. When m=o=s=0, the compounds are phosphonic acid derivatives of homopolyarylenes and copolyarylenes. If o is not equal to zero, the compounds are homopolyarylene ketones and copolyarylene ketones when Y=CO and homopolyarylene sulfones and copolyarylene sulfones when Y=SO$_2$. If m and s are also different from zero, the compounds are copolyarylene sulfones and copolyarylene ketones having one or more aromatic arylene ether units. If only o=0, the compounds are copolyarylene ethers. In a preferred embodiment, the oligomeric and polymeric compounds are made up exclusively of units of the formula (I).

R$^1$ is preferably an aromatic radical selected from the group consisting of 1,4-phenylene, 1,3-phenylene, 1,2-phenylene, 1,6-naphthylene, 2,4-naphthylene, 2,6-carbazole, 3-phenyl-1,4-arylene, 3-alkyl-1,4-arylene, 2-alkyl-1,4-arylene, 2-alkoxy-1,4-arylene, 3-alkoxy-1,4-arylene, 2,6-dimethyl-1,4-phenylene, 2,3,5,6-tetramethyl-1,4-phenylene, 4,4'-biphenylene, 3,3'-diphenyl-4,4'-biphenylene or arylenealkyls such as 2,2'-isopropylidenebis(1,4-phenylene).

R$^5$ can, independently of R$^1$, assume the same meanings as R$^1$; R$^5$ is preferably phenyl, 2,2'-isopropylidenebis(1,4-phenylene) or 2,2'-isopropylidenebiphenylene.

In a further preferred embodiment, Y is sulfonyl and n is 1 in the general formula (I).

In a further preferred embodiment, Y is carbonyl in the general formula (I).

In a further preferred embodiment, m, o and s are each 0 in the general formula (I).

The present invention also provides a process for preparing halogen-free, oligomeric or polymeric phosphonic acids made up of units of the general formula (I), which comprises the steps:

(a) reaction of oligomeric or polymeric compounds made up of units of the general formula (II)

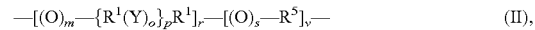

where:

| | |
|---|---|
| Y | is carbonyl or sulfonyl, |
| R$^1$, R$^5$ | are, independently of one another, divalent or polyvalent, substituted or unsubstituted, heteroatom-free or heteroatom-comprising aromatic radicals, |
| m, o, s | are each, independently of one another, 0 or 1, |
| r, v | are each, independently of one another, from 0 to 1, with the sum of r and v being from 0.95 to 1.05, and |
| p | is 0 or an integer ≥1, | where the radicals X are substituents on R$^1$ and R$^5$ and the radicals Y are parts of a polymer or oligomer chain, with halogenating agents at a temperature of from −20 to 140° C. in an inert solvent to give haloaromatic oligomeric or polymeric compounds made up of units of the general formula (III)

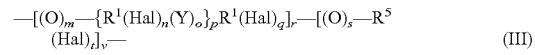

where R$^1$, R$^5$, Y, m, n, o, p, q, r, s, t and v have the meanings given for the units of the general formula (I) and Hal is halogen, (b) reaction of the haloaromatic, oligomeric or polymeric compounds made up of units of the general formula (III) obtained in step (a) with O-silylated oxygen compounds of trivalent phosphorus in a nitrogen-free solvent or a mixture of nitrogen-free solvents at temperatures above 100° C. in the presence of a catalyst comprising at least one metal of the platinum group of the Periodic Table of the Elements to give oligomeric or polymeric, silylated polyphosphonic acids made up of units of the general formula (IV)

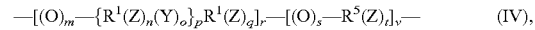

where R$^1$, R$^5$, Y, m, n, o, p, q, r, s, t and v have the meanings given for the units of the formula (I) and Z is —P(=O)(OSiR$^2$R$^3$R$^4$)(OSiR$^6$R$^7$R$^8$), where R$^2$, R$^3$, R$^4$, R$^6$, R$^7$, R$^8$ are, independently of one another, monovalent alkyl, alkenyl, arylaliphatic, cycloaliphatic or hetero group-comprising alkyl radicals, and (c) reaction of the oligomeric or polymeric, silylated phosphonic acids made up of units of the general formula (IV) obtained in step (b) with organic compounds having acidic hydrogen atoms to give halogen-free, oligomeric or polymeric phosphonic acids made up of units of the general formula (I)

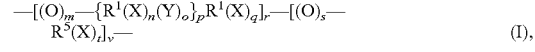

In the compounds made up of units of the general formula (IV), Z is a silylated group P(=O)(OSiR$^2$R$^3$R$^4$)(OSiR$^6$R$^7$R$^8$) bound to an aromatic radical, where R$^2$, R$^3$, R$^4$, $R^6$, $R^7$, $R^8$ can be identical or different, saturated or unsaturated alkyl radicals having up to 20 carbon atoms or part of a cycloaliphatic radical.

In a preferred embodiment, $R^2$, $R^3$, $R^4$, $R^6$, $R^7$, $R^8$ are identical linear or branched $C_1$-$C_{20}$-alkyl, alkenyl and aryl substituents, in particular methyl, ethyl, n-propyl, i-propyl, n-butyl, 1-(but-3-enyl), s-butyl, t-butyl, 1-pentyl, t-pentyl, 1-hexyl, 1-octyl, i-octyl, t-octyl, 2-ethylhexyl, 1-cyclooctyl, 1-cycloheptyl, 1-cyclohexyl, 1-cyclopentyl, 1-methylcyclopentyl, 1-methylcyclohexyl, 1-methyl-4-i-propylcyclohexyl, nonyl, decyl, undecyl, dodecyl, tridecyl, tetradecyl, pentadecyl, hexadecyl, heptadecyl, octadecyl, nonadecyl, eicosyl, 1,4-tetramethylene, —$(CH_2CH_2)nOCH_3$ where n is an integral variable from 1 to 100, preferably from 1 to 10, particularly preferably from 1 to 5.

In step (a) of the process of the invention, oligomeric or polymeric compounds made up of units of the general formula (II)

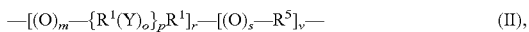   (II), where $R^1$, $R^5$, Y, m, o, p, r, s and v have the meanings given for the units of the general formula (I), are reacted with suitable halogenating agents at a temperature of from −20 to 140° C. in an inert solvent to give haloaromatic oligomeric or polymeric compounds of the general formula (III)

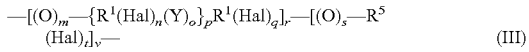   (III)

where $R^1$, $R^5$, Y, m, n, o, p, q, r, s, t and v have the meanings given for the units of the general formula (I) and Hal is halogen, preferably bromine.

Suitable methods of preparing compounds made up of units of the general formula (II) are known to those skilled in the art and are described, for example, in WO 2004/076530. Some compounds made up of units of the general formula (II) are commercially available, e.g. poly(ether sulfone) ULTRASON® E in which Y=$SO_2$, $R^1$=Ph, m=o=p=1, v=0, r=1 or degree of polymerization, poly(sulfone) ULTRASON® S in which Y=$SO_2$, $R^1$=Ph, m=o=p=r=v=1, $R^5$=2,2'-isopropylidenebis(1,4-phenylene), poly(phenyl sulfone) RADEL® R5000 in which Y=$SO_2$, $R^1$=Ph, m=o=p=r=v=1, $R^5$=4,4'-biphenyl or poly(ether ketone) VICTEX® 450 P in which Y=CO, $R^1$ and $R^5$=Ph, m=o=p=r=v=1.

Suitable inert solvents are alkylcarboxylic acids, chlorinated hydrocarbons such as methylene chloride, chloroform, dichloroethane, trichloroethane or tetrachloroethane, sulfuric acid, in particular concentrated sulfuric acid, and alkylsulfonic acids such as methanesulfonic, ethanesulfonic and/or propanesulfonic acid or mixtures thereof. The action of suitable halogenating agents known to those skilled in the art, preferably brominating agents such as elemental bromine, an N-bromo compound such as N-bromosuccinimide or dibromoisocyanuric acid, converts the compounds made up of units of the general formula (II) into compounds of the general formula (III).

The process is generally carried out at atmospheric pressure.

Suitable processes for reacting the compounds made up of units of the general formula (II) with a halogenating agent are carried out in a manner corresponding to halogenation processes known to those skilled in the art.

In the case of a polymer in which Y=$SO_2$ and v is not 0, for example poly(sulfone) ULTRASON® S, chlorinated hydrocarbons such as methylene chloride, chloroform, dichloroethane, trichloroethane or tetrachloroethane, preferably chloroform, are generally used for solution formation. The polymer can then preferably be brominated by addition of elemental bromine diluted with an inert solvent and stirring at from room temperature to the reflux temperature of the solvent. The degree of bromination can be controlled here by setting of a particular molar bromine/polymer ratio, by means of the reaction temperature and by means of the reaction time. To stop the reaction, the mixture is generally precipitated in a nonsolvent such as acetone, methanol, isohexane or mixtures thereof, the solid is comminuted mechanically and purified by extraction with a lower aliphatic alcohol, preferably methanol, particularly preferably methanol over potassium hydroxide, for from 20 to 48 hours, preferably from 12 to 36 hours, particularly preferably 24 hours.

In the case of a polymer in which m=p=o=1, v=0 and $R^1$=phenyl, for example ULTRASON® E, it is possible to use, for example, concentrated sulfuric acid solvent. The bromination is in this case generally achieved by addition of a particular amount of an N-bromo compound such as N-bromosuccinimide or dibromoisocyanuric acid (Monatshefte für Chemie, 99, 815-822, 1968) as a solution in the same solvent and stirring of the mixture at temperatures of 0-50° C. for a period of 1-24 hours. To work up the mixture, it is precipitated in a 2-20-fold excess of distilled water, the solid is comminuted mechanically and, after further washing with distilled water, purified by extraction with a lower aliphatic alcohol, preferably methanol, over a base, preferably potassium hydroxide, for 12-48 hours.

If Y=CO, as in the poly(ether ketone) VICTREX® 450 P, solutions are generally prepared by stirring the polymer in alkylsulfonic acids such as methanesulfonic, ethanesulfonic and/or propanesulfonic acid, preferably methanesulfonic acid, more preferably at an elevated temperature of less than 100° C., preferably from 30 to 80° C. Bromination can be achieved by addition of a particular amount of an N-bromo compound such as N-bromosuccinimide or dibromoisocyanuric acid as a solution in the same solvent and stirring at temperatures of generally 0-100° C. for a period of generally 1-24 hours. To work up the mixture, it is generally precipitated in a large excess, preferably a from 5- to 100-fold excess, of distilled water, the solid is comminuted mechanically and, after further washing with generally generous amounts of distilled water, purified by extraction, e.g. with a lower aliphatic alcohol, preferably methanol, over a base, preferably potassium hydroxide, for 12-48 hours.

The degree of bromination achieved can be determined by conventional methods, e.g. via the yield, NMR and elemental analysis of the C or Br content.

In step (b) of the process of the invention, the halogenated, oligomeric or polymeric compounds of the general formula (III) are reacted with O-silylated oxygen compounds of trivalent phosphorus at temperatures of above 100° C., preferably above 150° C., over a catalyst comprising at least one metal from the platinum group of the Periodic Table of the Elements in a nitrogen-free solvent or a mixture of nitrogen-free solvents.

In a preferred embodiment, $HP(OSiR^2R^3R^4)_2$ and/or $P(OSiR^2R^3R^4)_3$ are/is used as silylated phosphorus compound in the process of the invention. In terms of the general formula (IV), $R^2$ is identical to $R^6$, $R^3$ is identical to $R^7$ and $R^4$ is identical to $R^8$ in this preferred embodiment.

$R^2$, $R^3$ and $R^4$ are mutually identical or independent linear or branched $C_1$-$C_{20}$-alkyl, alkenyl and aryl substituents, preferably methyl, ethyl, n-propyl, i-propyl, n-butyl, 1-(but-3-enyl), s-butyl, t-butyl, 1-pentyl, t-pentyl, 1-hexyl, 1-octyl, i-octyl, t-octyl, 2-ethylhexyl, 1-cyclooctyl, 1-cycloheptyl, 1-cyclohexyl, 1-cyclopentyl, 1-methylcyclopentyl, 1-methylcyclohexyl, 1-methyl-4-i-propylcyclohexyl, nonyl, decyl, undecyl, dodecyl, tridecyl, tetradecyl, pentadecyl, hexadecyl, heptadecyl, octadecyl, nonadecyl, eicosyl, phenyl, biphenyl, 1,4-tetramethylene, —$(CH_2CH_2)_NOCH_3$ where n is an integral variable from 1 to 100, preferably from 1 to 10.

The silylated phosphorus(III)-oxygen compounds, in particular silylated phosphorous acid and $P(OSiR^2R^3R^4)_3$ and also mixtures of silylated oxygen compounds having different silyl radicals, are commercially available or can be prepared by silylation of phosphorous acid by means of one or more aminosilanes, halosilanes or alkoxysilanes bearing the $SiR^2R^3R^4$ group.

Particular preference is given to using tris(trimethylsilyl) phosphite.

The reaction in step (b) of the process of the invention is generally carried out on a solution of the polymer in organic nitrogen-free solvents having a boiling point of >100° C., preferably >150° C. The solvents which are preferably used are selected from the group consisting of diphenyl ether, diphenyl sulfone, benzophenone and mixtures thereof, with preference being given to the solvent having the best solvent power for the polymer to be reacted. The polymer content of the solution is generally from 3 to 90% by weight, with preference being given to a very high polymer content, usually 70% by weight.

Catalysts used in the polymer-analogous aromatic phosphonosilylation in step (b) of the process of the invention are ones which comprise at least one metal of the platinum group of the Periodic Table of the Elements, e.g. nickel, palladium, platinum, rhodium, ruthenium, osmium and/or iridium. The catalyst used preferably comprises nickel and/or palladium compounds in which the metal(s) is/are in the oxidation states 0 to +2.

Nickel can be used as Ni(II) salt $NiX_2$ in the form of halides (X=Cl, Br, I), preferably X=Cl, of pseudohalides (X=CN, OCN, SCN), preferably X=CN, of β-diketonates, preferably X=acetylacetonate, or Ni(0) compounds such as $Ni[CO]_4$, $Ni[P(OR)_3]_4$ where R is a linear or branched $C_1$-$C_{20}$-alkyl group, preferably ethyl (J. Org. Chem. 1980, 45, 5426-5429).

The amounts of catalyst employed are generally 0.01-1 molar equivalent based on the molar amount of bromine to be reacted, preferably 0.01-0.1 equivalent, particularly preferably 0.01-0.05 equivalent. If the nickel/bromine ratio is less than 0.01, complete reaction of bromine is not ensured.

In preferred embodiments, the nitrogen-free solvent with nickel(II) chloride does not have a light absorption at wavelengths of >450 nm.

The silylated phosphorus(III)-oxygen compounds, $P(OSiR^2R^3R^4)_3$ having identical or different substituents $R^2$, $R^3$, $R^4$ selected from among linear or branched C1-C20-alkyls, alkenyls, aryls, preferably $R^2=R^3=R^4$=methyl, which are generally used together with nickel catalysts, are generally used in a molar ratio of 1.0-2.5 to the molar amount of bromine to be reacted, preferably 1.25.

In a preferred embodiment, the brominated polymer is, for the purposes of the phosphonylation, placed together with the calculated amount of nickel catalyst in a sufficiently large reactor and freed of residual moisture by passing a fine stream of nitrogen over it at from 120 to 220° C., preferably from 150 to 210° C., particularly preferably 200° C., for 2-4 hours. This gas stream is maintained during the entire reaction time in order to ensure removal of volatile reaction products. After addition of the desired amount of solvent, preferably benzophenone, an orange to pale brown solution is produced by stirring at the abovementioned temperature. The silylated phosphorus component, preferably tris(trimethylsilyl) phosphite, is then added dropwise to the homogeneous mixture so that the entire amount is added to the mixture in about 30-45 minutes and the mixture has a homogeneous nature during the entire time. If an intensive red or violet coloration of the mixture does not occur within 1-15 minutes after commencement of the dropwise addition, the reaction temperature is increased and the increase in the temperature is continued in 5° C. steps until a color change becomes visible. Its appearance is accompanied by formation of a colorless liquid which fuses strongly in air and is carried out of the reaction vessel by the stream of $N_2$. After 1-4 hours, the reaction mixture is heat-treated to 170° C. and maintained at this temperature for a further 4-12 hours. The reaction mixture is worked up by methods known to those skilled in the art.

If palladium is used as catalyst, it is possible to employ Pd(II) compounds such as dichlorobis(triphenylphosphine) palladium(II) or Pd(0) compounds such as tetrakis(triphenylphosphine)palladium or tris(dibenzylideneacetone)palladium-chloroform adduct in molar ratios of generally from 0.025 to 0.5 based on the amount of bromine to be reacted.

The silylated phosphorus(III) oxygen compounds $HP(OSiR^2R^3R^4)_2$ having identical or different substituents $R^2$, $R^3$, $R^4$ which are linear or branched $C_1$-$C_{20}$ alkyls, alkenyls, aryls, preferably $R^2=R^3=R^4$=methyl, which are used together with Pd catalysts are used in a molar ratio of 1.2-2.5 to the molar amount of bromine to be reacted, preferably 1.25.

Halogen-free silylated phosphonic acids which form phosphonic acids which are free of halogen and transition metals on addition of solvents having an acidic hydrogen can be obtained by catalytic phosphonylation of halogen-substituted aromatic and semiaromatic polymers in nitrogen-free solvents at temperatures above 100° C., preferably above 150° C., particularly preferably at a temperature of from 151 to 200° C., even in the presence of small amounts of catalyst, preferably nickel and/or palladium catalyst, particularly preferably tetrakis(triphenylphosphine)palladium. Apart from the rings of the electron-rich aromatics, rings of the electron-poor aryl rings on the Y group are in this way also substituted with silylated phosphonic acid. The silylated phosphonic acids of the invention are formed by reaction of a halogenated precursor with silylated phosphorous acid $P(OSiR^2R^3R^4)$ or $HP(OSiR^2R^3R^4)_2$ without reactive alkyl-halogen by-products and with avoidance of residual unreacted aryl halides. Treatment of the resulting silylated polyphosphonic acid with, for example, alcohols enables free polyphosphonic acids without alkyl-halogen impurities to be obtained and to be purified in the same process step (step c)).

In step (c) of the process of the invention, the oligomeric or polymeric, silylated phosphonic acids made up of units of the general formula (IV) obtained in step (b) are reacted with organic compounds having acidic hydrogen atoms to give halogen-free, oligomeric or polymeric phosphonic acids made up of units of the general formula (I)

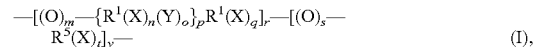

$$—[(O)_m—\{R^1(X)_n(Y)_o\}_pR^1(X)_q]_r—[(O)_s— \atop R^5(X)_t]_v— \qquad (I),$$

where $R^1$, $R^5$, X, Y, m, n, o, p, q, r, s, t and v are as defined above.

After the reaction in step (b) of the process of the invention is complete, the mixture is generally taken up in a suitable low-boiling solvent, for example tetrahydrofuran, and freed of solvent, reaction residues and catalyst by precipitation by means of water or an organic compound having acidic hydrogen atoms, for example an alcohol, preferably methanol, resulting in the silyl esters being cleaved to form phosphonic acid at the same time. The amount of alcohol used for this purpose is usually 3-20 times the weight of the amount of compounds made up of units of the general formula (IV) to be reacted. An improved removal of catalyst can be achieved by acidification of the reaction mixture with 0.1-5% by volume of a strong mineral acid, preferably concentrated HCl, HBr or dilute $HNO_3$. The organic compound having acidic hydrogen atoms, preferably an alcohol, is replaced after acting on the reaction product for 30-120 minutes and this procedure is repeated 3-10 times. The purification and ester cleavage step, preferably the alcoholysis step, can be intensified by simultaneous action of ultrasound or by Soxhlet extraction of the mixture with a weakly acidic alcohol such as methanol in combination with HCl, HBr or $HNO_3$ for 12-48 hours. A further method of simultaneous purification-ester cleavage comprises repeated dissolution and precipitation of the reaction product in suitable solvents and acidic precipitants. Examples of suitable solvents are dimethylacetamide (DMAC), N-methyl-2-pyrrolidone (NMP), dimethylformamide (DMF), tetrahydrofuran (THF) or mixtures thereof, and suitable precipitants are, for example, water, methanol, ethanol, isopropanol or mixtures thereof. The purified polymeric phosphonic acid obtained is freed of extractant by drying at 50-100° C. under reduced pressure.

In step c) of the process of the invention, preferably more than 60%, particularly preferably more than 70%, very particularly preferably more than 80%, very particularly preferably more than 90%, of the silyl ester is cleaved. The product after step c) has been carried out therefore preferably comprises more than 60%, particularly preferably more than 70%, very particularly preferably more than 80%, very particularly preferably more than 90%, of compounds made up of units of the general formula (I) and preferably less than 40%, particularly preferably less than 30%, very particularly preferably less than 20%, very particularly preferably less than 10%, of compounds of the general formula (IV).

The present invention also provides halogen-free, oligomeric or polymeric, silylated phosphonic acids made up of units of the general formula (IV)

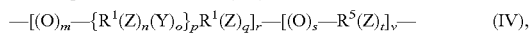    (IV), where:

| | |
|---|---|
| Z | is —P(=O)($OSiR^2R^3R^4$)($OSiR^6R^7R^8$) where $R^2$, $R^3$, $R^4$, $R^6$, $R^7$, $R^8$ are, independently of one another, monovalent alkyl, alkenyl, arylaliphatic, cycloaliphatic or heterogroup-comprising alkyl radicals, |
| Y | is carbonyl or sulfonyl, |
| $R^1$, $R^5$ | are, independently of one another, divalent or polyvalent, substituted or unsubstituted, heteroatom-free or heteroatom-comprising aromatic radicals, |
| m, o, s | are each, independently of one another, 0 or 1, |
| n, q, t | are each, independently of one another, 0 or an integer from 1 to 8, with n and s not simultaneously being 0, |
| r, v | are each, independently of one another, from 0 to 1, with the sum of r and v being from 0.95 to 1.05, and |
| p | is 0 or an integer ≥ 1, | where the radicals Z are substituents on $R^1$ and $R^5$ and the radicals Y are parts of a polymer or oligomer chain.

For the purposes of the present invention, "halogen-free" means a halogen content of less than 1% by weight, preferably less than 0.5% by weight, particularly preferably less than 0.3% by weight, in each case based on the mass of phosphonylated product.

These compounds are aromatic or semiaromatic polymers in which Z and Y are bound to aromatic radicals, with Z being a substituent on the aromatic parts of the polymer and Y being present in the polymer chain. When m=o=s=0, the compounds are phosphonic acid derivatives of homopolyarylenes and copolyarylenes. If o is not equal to zero, the compounds are homopolyarylene ketones and copolyarylene ketones when Y=CO and homopolyarylene sulfones and copolyarylene sulfones when $Y=SO_2$. If m and s are also different from zero, the compounds are copolyarylene sulfones and copolyarylene ketones having one or more aromatic arylene ether units. If only o=0, the compounds are copolyarylene ethers. In a preferred embodiment, the oligomeric and polymeric compounds are made up exclusively of units of the formula (IV).

$R^1$ is preferably selected from the group consisting of 1,4-phenylene, 1,3-phenylene, 1,2-phenylene, 1,6-naphthylene, 2,4-naphthylene, 2,6-carbazole, 3-phenyl-1,4-arylene, 3-alkyl-1,4-arylene, 2-alkyl-1,4-arylene, 2-alkoxy-1,4-arylene, 3-alkoxy-1,4-arylene, 2,6-dimethyl-1,4-phenylene, 2,3,5,6-tetramethyl-1,4-phenylene, 4,4'-biphenylene, 3,3'-diphenyl-4,4'-biphenylene or arylenealkyls such as 2,2'-isopropylidenebis(1,4-phenylene).

$R^5$ can, independently of $R^1$, assume the same meanings as $R^1$; $R^5$ is preferably phenyl, 2,2'-isopropylidenebis(1,4-phenylene) or 2,2'-isopropylidenebiphenylene.

In the compounds made up of units of the general formula (IV), Z is a silylated phosphonic acid P(=O)($OSiR^2R^3R^4$)($OSIR^6R^7R^8$) bound to an aromatic radical, where $R^2$, $R^3$, $R^4$, $R^6$, $R^7$, $R^8$ can be identical or different saturated or unsaturated alkyl radicals having up to 20 carbon atoms or part of a cycloaliphatic radical.

In a preferred embodiment, $R^2$, $R^3$, $R^4$, $R^6$, $R^7$, $R^8$ are identical linear or branched $C_1$-$C_{20}$-alkyl, alkenyl and aryl substituents, in particular methyl, ethyl, n-propyl, i-propyl, n-butyl, 1-(but-3-enyl), s-butyl, t-butyl, 1-pentyl, t-pentyl, 1-hexyl, 1-octyl, i-octyl, t-octyl, 2-ethylhexyl, 1-cyclooctyl, 1-cycloheptyl, 1-cyclohexyl, 1-cyclopentyl, 1-methylcyclopentyl, 1-methylcyclohexyl, 1-methyl-4-i-propylcyclohexyl, nonyl, decyl, undecyl, dodecyl, tridecyl, tetradecyl, pentadecyl, hexadecyl, heptadecyl, octadecyl, nonadecyl, eicosyl, 1,4-tetramethylene, —($CH_2CH_2$)$nOCH_3$ where n is an integral variable from 1 to 100, preferably from 1 to 10, particularly preferably from 1 to 5.

The present invention also provides a process for preparing halogen-free, oligomeric or polymeric, silylated phosphonic acids made up of units of the general formula (IV), which comprises the steps:

(a) reaction of oligomeric or polymeric compounds made up of units of the general formula (II)

    (II), where:

| | |
|---|---|
| Y | is carbonyl or sulfonyl, |
| $R^1$, $R^5$ | are, independently of one another, divalent or polyvalent, substituted or unsubstituted, heteroatom-free or heteroatom-comprising aromatic radicals, |
| m, o, s | are each, independently of one another, 0 or 1, with n and s not simultaneously being 0, |
| r, v | are each, independently of one another, from 0 to 1, with the sum of r and v being from 0.95 to 1.05, and |
| p | is 0 or an integer ≥ 1, | where the radicals X are substituents on $R^1$ and $R^5$ and the radicals Y are parts of a polymer or oligomer chain, with halogenating agents at a temperature of from -20 to 1400C in an inert solvent to give haloaromatic oligomeric or polymeric compounds made up of units of the general formula (III)

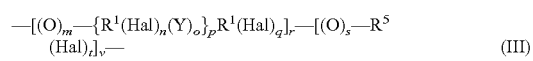    (III)

where $R^1$, $R^5$, Y, m, n, o, p, q, r, s, t and v have the meanings given for the units of the general formula (I) and Hal is halogen, and (b) reaction of the haloaromatic, oligomeric or polymeric compounds made up of units of the general formula (III) obtained in step (a) with O-silylated oxygen compounds of trivalent phosphorus in a nitrogen-free solvent or a mixture of nitrogen-free solvents at temperatures above 100° C. in the presence of a catalyst comprising a metal of the platinum group of the Periodic Table of the Elements to give oligomeric or polymeric, silylated polyphosphonic acids made up of units of the general formula (IV)

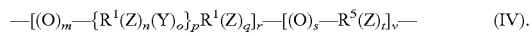  (IV).

Steps (a) and (b) of this process according to the invention have been described above.

The present invention also provides halogen-free mixtures comprising
(A) from 0.1 to 99.9% by weight of one or more compounds made up of units of the general formula (I) and
(B) from 0.1 to 99.9% by weight of a nitrogen-free solvent having a boiling point of >150° C.

These halogen-free mixtures of the invention are preferably mixtures comprising from 0.1 to 99.9% by weight, particularly preferably from 40 to 80% by weight, of one or more compounds according to the invention of the general formula (I) and from 0.1 to 99.9% by weight, particularly preferably from 20 to 60% by weight, of a nitrogen-free organic solvent or mixtures thereof having a boiling point of >150° C. The compounds made up of units of the general formula (I) can be present in the abovementioned proportions in admixture with compounds made up of units of the general formula (IV).

The solvents are the same ones as are also used as reaction medium for the phosphonylation reaction. Preference is given to diphenyl ether, benzophenone, diphenyl sulfone, the methyl-, ethyl-, propyl-, butyl-, methoxy-, ethoxy-, propoxy-, butoxy-substituted derivatives of these compounds, aliphatic, partly aromatic and aromatic oligoethers and polyethers, aliphatic, partly aromatic and aromatic β-diketones such as acetylacetone, acetylbenzophenone, 1,3-diphenylpropane-1,3-dione and their alkyl-, alkoxy-, aryl- and aryloxy-substituted derivatives, aliphatic, partly aromatic and aromatic keto ethers and aliphatic, partly aromatic and aromatic carboxylic esters and carbonates of this type and also mixtures of the above substances.

The halogen-free polymers of the invention made up of units of the general formula (I) can be used to produce films or composites which preferably serve as proton-conducting membranes and membrane components in polymer electrolyte fuel cells.

The present invention also provides films or composites comprising at least one compound made up of units of the general formula (I).

The present invention also provides polymer blends comprising at least one compound made up of units of the general formula (I) and at least one further polymer.

Suitable blend partners are unfunctionalized polymers. For the purposes of the present invention, the term "unfunctionalized polymer" refers to polymers which are neither perfluorinated and sulfonated (ionomeric) polymers such as Nafion® or Flemion® nor polymers functionalized with suitable groups to give a sufficient proton conductivity, for example —$SO_3H$ groups or —COOH groups. These unfunctionalized polymers which can be used for the purposes of the present invention are not subject to any particular restrictions as long as they are stable in the applications in which the polymer systems of the invention are used. If, according to a preferred use, they are used in fuel cells, use is made of polymers which are thermally stable up to 100° C. and preferably up to 200° C. or higher and have a very high chemical stability. Preference is given to using:

polymers having an aromatic backbone, for example polyimides, polysulfones, polyether sulfones, for example Ultrason®, polymers having a fluorinated backbone, for example Teflon® or PVDF, thermoplastic polymers or copolymers, for example polycarbonates such as polyethylene carbonate, polypropylene carbonate, polybutadiene carbonate or polyvinylidene carbonate, or polyurethanes as are described, inter alia, in WO 98/44576, crosslinked polyvinyl alcohols, vinyl polymers such as
  polymers and copolymers of styrene or methylstyrene, vinyl chloride, acrylonitrile, methacrylonitrile, N-methylpyrrolidone, N-vinylimidazole, vinyl acetate, vinylidene fluoride,
  copolymers of vinyl chloride and vinylidene chloride, vinyl chloride and acrylonitrile, vinylidene fluoride and hexafluoropropylene,
  terpolymers of vinylidene fluoride and hexafluoropropylene and also a compound from the group consisting of vinyl fluoride, tetrafluoroethylene and trifluoroethylene; such polymers are, for example, disclosed in U.S. Pat. No. 5,540,741, whose relevant disclosure content is fully incorporated by reference into the present patent application;

phenol-formaldehyde resins, polytrifluorostyrene, poly-2,6-diphenyl-1,4-phenylene oxide, polyaryl ether sulfones, polyarylene ether sulfones, phosphonated poly-2,6-dimethyl-1,4-phenylene oxide;

homopolymers, block polymers and copolymers prepared from:
  olefinic hydrocarbons such as ethylene, propylene, butylene, isobutene, propene, hexane or higher homologues, butadiene, cyclopentene, cyclohexene, norbornene, vinylcyclohexane,
  acrylic or methacrylic esters such as methyl, ethyl, propyl, isopropyl, butyl, isobutyl, hexyl, octyl, decyl, dodecyl, 2-ethylhexyl, cyclohexyl, benzyl, trifluoromethyl or hexafluoropropyl esters or tetrafluoropropyl acrylate or tetrafluoropropyl methacrylate,
  vinyl ethers such as methyl, ethyl, propyl, isopropyl, butyl, isobutyl, hexyl, octyl, decyl, dodecyl, 2-ethylhexyl, cyclohexyl, benzyl, trifluoromethyl or hexafluoropropyl or tetrafluoropropyl vinyl ether;

basic, nitrogen-comprising polymers such as poly(p-phenylquinoxaline), poly(benzimidazoles).

All these unfunctionalized polymers can in principle be used in crosslinked or uncrosslinked form. It is also possible to use mixtures of the polymers mentioned.

Particular preference is given to using a polymer selected from the group consisting of poly(benzimidazole), poly(p-phenylquinoxaline) and mixtures thereof as blend partner.

From 5 to 95% by weight of polymers of the general formula (I) and from 5 to 95% by weight of at least one further polymer are present in the polymer blends.

The present invention also provides membranes comprising at least one compound made up of units of the general formula (I) or at least one polymer blend comprising at least one compound made up of units of the general formula (I) and basic nitrogen-comprising aromatic polymers.

The present invention also provides for the use of a membrane comprising at least one compound made up of units of the general formula (I) or at least one polymer blend comprising at least one compound made up of units of the general formula (I) and basic nitrogen-comprising aromatic polymers in fuel cells or as membranes for separation technology, preferably as selectively permeable membranes in the desalination of water, wastewater purification, dialysis and in ion extraction and retention.

The present invention also provides for the use of at least one compound made up of units of the general formula (I) or a polymer blend comprising at least one compound made up of units of the general formula (I) and basic nitrogen-comprising aromatic polymers in fuel cells.

The present invention also provides fuel cells comprising at least one compound made up of units of the general formula (I) or a polymer blend comprising at least one compound made up of units of the general formula (I) and basic nitrogen-comprising aromatic polymers.

Phosphonic-acid polyelectrolyte membranes comprising the phosphonic-acid aromatic polymers of the invention are generally produced by dissolution of the phosphonic-acid polyelectrolyte in an organic solvent, application of the preferably filtered solution or mixture to a suitable surface or impregnation of the support material with this and subsequent partial to complete evaporation of the solvent. The addition of soluble or homogeneously dispersed additives such as further polyelectrolytes, stabilizers, fillers and perogens such as poly(ethylene oxide), poly(propylene oxide), poly(vinyl alcohol) to the preferably filtered polymer solution and subsequent processing of this to form a membrane is also possible. The choice of solvent is restricted only by a suitable solvent power and inertness toward the phosphonic-acid aromatic polymer and comprises chlorinated hydrocarbons such as dichloromethane, chloroform and carbon tetrachloride, 1,2-dichloroethane, chlorobenzene and dichlorobenzene, ethers such as diethyl ether, tetrahydrofuran and dioxane, alkylene glycol alkyl ethers such as ethylene glycol methyl ether, ethylene glycol ethyl ether and propylene glycol methyl ether, alcohols such as methanol, ethanol and propanol and also the preferred aprotic, polar liquids of the amide type, e.g. N,N-dimethylformamide, N,N-dimethylacetamide and N-methylpyrrolidone, particularly preferably N-methylpyrrolidone, and also mixtures of these solvents.

An improvement in the solubility of, in particular, highly functionalized phosphonic-acid aromatic polymers in organic solvents can be achieved, for example, by addition of 0.05-2% by volume of a strong acid to the solvent, as long as this does not hinder the formation of a homogeneous solution. Acids used are concentrated aqueous hydrogen halide solutions such as HCl or HBr or concentrated sulfuric acid or nitric acid or strong organic acids such as alkylsulfonic acids and trifluoroacetic acid.

Surfaces to which the polymer solutions can be applied are, for example, glass, glasses hydrophobicized by silanization and plastic films, and as support materials, plastic meshes, porous plastic membranes and other substrates suitable for reinforcement, flexibilization and increasing the toughness.

After application of the polymer solution to the surface as described above or impregnation of the substrate as described above, the solvent is completely or partly removed by evaporation at temperatures of generally 0-150° C. If the solvent is very largely removed by means of a sufficient drying temperature and time, a homogeneous membrane without morphological structuring is generally obtained.

The residual amount of solvent in the film can be influenced by the choice of dry temperature and time. Surface-porous, unsymmetrical membrane morphologies can be produced by dipping a film or composite comprising residual solvent into a precipitation bath which is miscible with the solvent and incompatible with the polyelectrolyte. The nature and morphology of the porous structure produced thereby can be influenced by the residual solvent content, choice of the precipitation bath and its temperature.

The membrane structures produced can be used for increasing the surface area required for taking up ions or contacting the membrane with an electrode layer and also as micro hollow spaces for precipitation of the polymeric or low molecular weight substances which have a positive influence on the proton conductivity, e.g. acid polyelectrolytes or zirconium(IV) phosphates, zirconium(IV) phosphonates and zirconium(IV) sulfonephosphonates, silicates which promote water retention at elevated temperature or acid-functionalized silicates, as long as the chemical resistance and mechanical strength, flexibility and separating power of the membrane are not adversely affected.

The thickness of the membrane produced can be influenced by the concentration of the polymer electrolyte solution used, the layer thickness of the applied polymer solution and also the thickness of the support material used, with a very thin membrane being preferred in order to increase the proton conductivity. A preferred membrane thickness for use as fuel cell membrane is 1-200 µm and is selected so that a very high proton conductivity results at an appropriate mechanical strength and diffusion barrier action.

A further application of the phosphonic-acid polyelectrolytes of the invention is reducing swelling of aromatic polyphosphonic acid membranes and polyelectrolyte-polyphosphonic acid blend membranes via ionically crosslinking in-situ formation of zirconium(IV) polyphosphonates by action of Zr(IV) salt solutions on such membranes. The polyelectrolytes of the invention can likewise serve as nonmigrating, polyphosphonic-acid component in blend membranes together with basic nitrogen-comprising aromatic polymers such as poly(benzimidazole) or poly(p-phenylquinoxaline).

Further applications of the phosphonic-acid polyelectrolytes of the invention are aiding or improving contact between apatite surfaces of teeth or bones and plastic or metal implants. Here, the polyphosphonic acid material can be employed in pure form, as a mixture with various additives and as property-improving blend constituent.

The polyphosphonic acids of the invention can also serve as corrosion-inhibiting metal coatings or as bonding layer between a metal surface and further materials.

EXAMPLES

The abbreviation dsBr means "degree of substitution with bromine" =degree of bromination Example 1

Preparation of a Phosphonic-Acid Poly(Electrolyte) Based on Poly(Sulfone) ULTRASON® S Preparation of the Brominated Precursor 100 g (225.97 mmol of bisphenol A units) of poly(sulfone) ULTRASON® S (BASF AG), henceforth referred to as P1, are dissolved by stirring in 400 ml of chloroform for 20 minutes in a 1000 ml three-necked flask provided with reflux condenser, dropping funnel and stirrer in an oil bath heated to 70° C. A solution of 58 g (362.7 mmol) of bromine in 100 ml of chloroform is allowed to run quickly into the resulting pale beige and slightly opaque solution while stirring rapidly. The intensively reddish brown, homogeneous mixture is stirred further at 70° C. and the HBr evolved is trapped by passing it into KOH solution.

After 3 hours, the mixture is precipitated by pouring it quickly into 2.5 l of a vigorously stirred 4:1 (v/v) mixture of methanol/acetone at 20° C. After stirring for 5 minutes, the precipitate is decanted off, replaced by 1.5 l of the same mixture and the polymer is broken up mechanically therein.

The white flocks obtained are purified by Soxhlet extraction with pure methanol over KOH for 24 hours and subsequently dried at 100° C. under reduced pressure for 24 hours.

The product obtained will henceforth be referred to as br-P1.

| Yield: | 118.3 g |
|---|---|

A degree of bromination dsBr=103 mol %, corresponding to 1.03 bromine atoms per bisphenol A unit, is calculated from the increase in mass.

Elemental analysis:

| C: | 62.2% (calc.) | 61.95% (found) |
|---|---|---|
| H: | 4.08% (calc.) | 4.10 (found) |
| S: | 6.20% (calc.) | 6.19% (found) |

Given that dsBr=410.5943/w(C)-5.6082, it follows that dsBr=102 mol %, corresponding to 1.02 bromine atoms per bisphenol A unit.

1H NMR spectrum (300 MHz, CDCl3):
1.69 ppm, integrated value=1 (i-propylidene H)
6.94-7.87 ppm, integrated value=2.83 (Ar—H)

Preparation of the Phosphonic Acid Polymer
pho-P1.1

10 g of the brominated precursor br-P1 (19.63 mmol of bromine) together with 250 mg (1.96 mmol) of anhydrous Ni(II) chloride are placed in a 250 ml three-necked flask provided with stirrer, open air condenser and dropping funnel closed by means of a septum and provided with a nitrogen inlet. The mixture is freed of residual moisture in an oil bath heated to 190° C. by passing a slow stream of nitrogen into it. 3 g of benzophenone are added to the dry mixture and a counter-current of $N_2$ and the polymer is processed with stirring for 1 hour to form a homogeneous, highly viscous, light-beige solution. After the oil bath temperature has been increased to 200° C., 7.33 g (24.54 mmol) of tris(trimethylsilyl) phosphite are introduced into the dropping funnel via the septum and this is added to the mixture over a period of 30 minutes while stirring. About 2 minutes after commencement of the addition, a color change through purple to dark blue is observed and a clear, colorless liquid which fumes strongly in air is driven off into a cold trap via the stream of $N_2$. About 4 ml of this liquid were condensed in the cold trap over the course of the next 4 hours, while a deepening of the color and an increase in the viscosity became visible in the reaction mixture. The stirrer was switched off and the mixture was heated at 170° C. for 8 hours. After cooling to room temperature, a sample is taken under a countercurrent of $N_2$ and this is freed of benzophenone, residual trimethylsilyl bromide and residual tris(trimethylsilyl) phosphite by treatment with ultrasound and three×10 ml of absolute isohexane with exclusion of air and moisture. A 1H NMR spectrum of the beige sample obtained after removal of the extractant by drying at 100° C. in a stream of nitrogen, hereinafter referred to as phoSi—P1, is recorded in tetramethylsilane-free d6-dimethyl sulfoxide.

The remaining mixture is freed of benzophenone by treatment with ultrasound and 250 ml of a 100:2 (v/v) mixture of methanol/hydrochloric acid and the phosphonic acid is at the same time set free by alcoholytic cleavage of the silyl ester. The viscous paste-like product obtained is broken up mechanically and Soxhlet extracted with methanol over KOH for 12 hours. Drying at 75° C. under reduced pressure gives a compact, light-beige material. This is found to be readily soluble in warm N-methylpyrrolidone to form a light-beige, conspicuously viscous solution. On addition of a few drops of a 1% strength (m/m) Zr(acetylacetonate)/4-N-methylpyrrolidone solution, a white precipitate of Zr(IV)-polyphosphonic acid which was insoluble in dimethyl sulfoxide, N,N-dimethylformamide, N,N-dimethyl-acetamide and trifluoroacetic acid was able to be precipitated. A corresponding precipitation cannot be observed on N-methylpyrrolidone solutions of P1 and br-P1.

A 1H- and 31P-NMR spectrum of the product obtained, which will hereinafter be referred to as pho-P1, is recorded in tetramethylsilane-free d6-dimethyl sulfoxide.

| Yield: | 9.30 g |
|---|---|

Determination of the Bromine Content:

Oxidative digestion of pho-P1 with $KNO_3/NaO_2$ and titration with $AgNO_3$ solution and backtitration with FeSCN solution indicates a bromine content below the detection limit of 0.3% by weight.

Thermogravimetric analysis of phoP1:
Netzsch STA 409, heating rate: 10 K/min, air atmosphere:
5% loss in weight at 220° C.
25% loss in weight at 440° C.
65.5% loss in weight at 600° C.

1H-NMR spectrum of phoSi—P1 (300 MHz, d6-dimethyl sulfoxide):
0.01-0.05 ppm, integrated value=1.86 ppm (Si—CH3, 18 H)
1.64 ppm, integrated value=1.00 (i-propylidene H, 6 H)
6.85-7.9 ppm, integrated value=2.62 (Ar—H)

The ratio of the normalized integrals of Si—CH3 to i-propylidene H gives a degree of phosphonylation of 62 mol %, corresponding to 0.62 disilyl phosphonate groups per bisphenol A unit.

1H-NMR spectrum of pho-P1 (300 MHz, d6-dimethyl sulfoxide):
1.63 ppm, integrated value=1.00 (i-propylidene H, 6 H)
6.85-7.9 ppm, integrated value=2.64 (Ar—H)

31P-NMR spectrum of pho-P1 (121.5 MHz, 300 MHz H decoupling, d6-dimethyl sulfoxide):
19 ppm (phosphonic acid)

| Gravimetric determination of P: | w(P) = 6.1%, corresponding to 96 mol % phosphonylation |
|---|---|

Preparation of the Phosphonic-Acid Polymer
pho-P1.2

3 g of the brominated precursor br-P1 (5.85 mmol of bromine) together with 15.2 mg (0.12 mmol) of anhydrous nickel (II) chloride, corresponding to 2 mol % based on the bromine content, were reacted with 2.18 g (7.31 mmol) of tris(trimethylsilyl) phosphite in 6 ml of diphenyl ether in the manner described above. A comparable course of the reaction was observed and the products were worked up in the above-described way.

| Yield: | 2.87 g |
|---|---|

Determination of the Bromine Content:

Oxidative digestion of pho-P1.2 with $KNO_3/NaO_2$ and titration with $AgNO_3$ solution and backtitration with FeSCN solution indicated a bromine content below the detection limit of 0.3% by weight.

Determination of the Phosphorus Content:

Oxidative digestion of the sample of pho-P1.2 with KNO3/$NaO_2$. The average value over three determinations as 8-hydroxyquinolinium molybdophosphate precipitation and gravimetric analysis gives a phosphorus content of 5.93% by weight, corresponding to a degree of functionalization of 100.2 mol % and a Br—P conversion of 98.2% of theory.

Example 2

Preparation of a Phosphonic-Acid Poly(Electrolyte) Based on Poly(Ether Sulfone) ULTRASON® E (Substance P2)

Preparation of the Brominated Precursor br-P2

100 g (861.2 mmol of phenyl functions) of poly(ether sulfone) ULTRASON® E (BASF AG), henceforth referred to as P2, are dissolved in 600 ml of concentrated (95-98%) sulfuric acid in a 1000 ml two-necked flask provided with dropping funnel and stirrer at room temperature for 4 hours. A solution of 46.36 g (323.2 mmol of active bromine) of dibromoisocyanuric acid in 300 ml of concentrated (95-98%) sulfuric acid are added to the resulting pale beige, transparent solution while stirring rapidly. A light-beige fine precipitate precipitates after a few minutes. After stirring at room temperature for 3 hours, the mixture is precipitated in 5000 ml of distilled water while stirring and cooling in ice and the solid is washed free of acid by multiple replacement of the precipitate. The white polymer threads obtained are broken up mechanically and Soxhlet extracted with methanol over KOH for 24 hours. Drying at 100° C. under reduced pressure for 12 hours gives compact white flocks.

| Yield: | 124.6 g of white flocks and rods |
|---|---|

A degree of bromination dsBr=72 mol %, corresponding to 0.72 bromine atom per bisphenol A unit, is calculated from the increase in mass.

Elemental analysis of br-P2:

| C: | 49.82% (calc.) | 49.69% (found) |
|---|---|---|
| H: | 2.51% (calc.) | 2.57% (found) |
| S: | 11.09% (calc.) | 11.50% (found) |
| N: | 0.00% (calc.) | 0.00% (found) |

Given that dsBr=182.4863/w(C)-2.9433, it follows that dsBr=73 mol %, corresponding to 0.73 bromine atom per repeating unit.

1H NMR spectrum of br-P2 (300 MHz, d6-di methyl sulfoxide):

7.23-7.27 ppm, integrated value 4.17 (Ar—H)
7.31-7.38 ppm, integrated value 0.34 (Ar—H)
7.98-7.99 ppm, integrated value 3.57 (Ar—H)
8.03-8.05 ppm, integrated value 1.00 (Ar—H)
8.34-8.45 ppm, integrated value 0.72 (Ar—H)

Preparation of the Phosphonic Acid Polymer pho-P2

10 g of the brominated precursor br-P2 (25.73 mmol of bromine) and 334 mg (2.57 mmol) of anhydrous Ni(II) chloride are placed in a 100 ml three-necked flask provided with stirrer, open air condenser and dropping funnel closed by means of a septum and provided with a nitrogen inlet. The mixture is freed of residual moisture in an oil bath heated to 190° C. by passing a slow stream of nitrogen through it. 3 g of benzophenone are added to the dry mixture under a countercurrent of $N_2$ and the polymer is processed with stirring for 1 hour to give a highly viscous, light-brown solution. After the oil bath temperature has been increased to 200° C., 9.6 g (32.17 mmol) of tris(trimethylsilyl) phosphite are introduced into the dropping funnel via the septum and these are added to the mixture over a period of 30 minutes while stirring. 2 minutes after commencement of the addition, a color change through purple to dark blue is observed and a clear colorless liquid which fumes strongly in air is driven off into a cold trap by the stream of $N_2$. About 4 ml of this liquid are condensed in the cold trap over the course of the next 4 hours, while a deepening of the color and an increase in the viscosity become visible in the reaction mixture. The stirrer is switched off and the mixture is heated at 170° C. for 8 hours. After cooling to room temperature, a sample is taken under a countercurrent of $N_2$ and this is freed of benzophenone, residual trimethylsilyl bromide and residual tris(trimethylsilyl) phosphite by treatment with ultrasound and three×10 ml of absolute isohexane with exclusion of air and moisture. A 1H spectrum of this beige sample obtained after removal of the extractant by drying at 100° C. in a stream of nitrogen, hereinafter referred to as phoSi-P2, is recorded in tetramethylsilane-free d6-dimethyl sulfoxide. The remaining mixture is freed of benzophenone by treatment with ultrasound and 250 ml of a 100:2 (v/v) mixture of methanol/hydrochloric acid and the phosphonic acid is at the same time set free by alcoholytic cleavage of the silyl ester. The compact product obtained is broken up mechanically and Soxhlet extracted with methanol over KOH for 12 hours.

Drying at 75° C. under reduced pressure gives a compact, light-beige material. This is found to be readily soluble in warm N-methylpyrrolidone to form a light-beige, conspicuously viscous solution. On addition of a few drops of a 1% strength (m/m) Zr(acetylacetonate)$_4$-N-methylpyrrolidone solution, a whitish precipitate of Zr(IV) polyphosphonate which is insoluble in dimethyl sulfoxide, N,N-dimethylformamide, N,N-dimethylacetamide, trifluoroacetic acid and sulfuric acid is able to be precipitated. A corresponding precipitation is not observed on N-methylpyrrolidone solutions of P2 and br-P2.

A 1H- and 31P-NMR spectrum of the product obtained, hereinafter referred to as pho-P2, is recorded in tetramethylsilane-free d6-dimethyl sulfoxide.

| Yield: | 9.1 g of light-beige compact material. |
|---|---|

Determination of the Bromine Content:

Oxidative digestion of pho-P2 with $KNO_3/NaO_3$ and titration with $AgNO_3$ solution and backtitration with FeSCN solution indicates a bromine content below the detection limit of 0.3% by weight.

Thermogravimetric Analysis of pho-P2:

(Netzch STA 409, heating rate: 10 K/min, air atmosphere):
5% loss in weight at 330° C.
25% loss in weight at 470° C.
51.1% loss in weight at 600° C.

1H-NMR spectrum of phoSi—P2 (300 MHz, d6-dimethyl sulfoxide):
0.01-0.05 ppm, integrated value=1.00 (Si—$CH_3$, 18 H)
7.9-8.4 ppm, integrated value=2.86 (Ar—H)

The ratio of the normalized integrals of Si—$CH_3$ to Ar—H gives a degree of phosphonylation of 15.3 mol %, corresponding to 0.15 disilyl phosphonate group per monomer unit.

1H-NMR spectrum of pho-P2 (300 MHz, d6-dimethyl sulfoxide):

| | |
|---|---|
| 7.9-8.4 ppm, | integrated value = 8 (Ar—H) |

31P-NMR spectrum of pho-P2 (121.5 MHz, 300 MHz H decoupling, d6-dimethyl sulfoxide):
19.2 ppm (phosphonic acid)

Example 3

Preparation of Phosphonic-Acid Poly(Electrolyte) Based on Poly(Ether Ketone) VICTREX® 450 P (Substance P3)

Preparation of the Brominated Precursor br-P3

25 g (86.71 mmol of repeating units) of poly(ether ketone) VICTREX® 450 P, henceforth referred to as P3, are dissolved in 200 ml of pure methanesulfonic acid in a 250 ml two-necked flask provided with dropping funnel and stirrer at 50° C. for 8 hours. A solution of 15.43 g (86.71 mmol of active bromine) of N-bromo-succinimide in 25 ml of pure methanesulfonic acid is added via the dropping funnel to the resulting dark orange, highly viscous solution while stirring rapidly. After stirring at 50° C. for 24 hours, the dark orange mixture is precipitated in 1000 ml of distilled water while cooling in ice and the solid is washed free of acid by multiple replacement of the precipitate. The light-gray polymer threads obtained are broken up mechanically and Soxhlet extracted with methanol over KOH for 24 hours.

Drying at 100° C. under reduced pressure for 12 hours gives light-gray rods. An 1H-NMR spectrum of the product obtained, henceforth referred to as br-P3, is recorded in trifluoromethanesulfonic acid solution using an external d6-acetone lock.

| | |
|---|---|
| Yield: | 31.75 g |

A degree of bromination dsBr=0.99 mol %, corresponding to 0.99 bromine atom per monomer unit, is calculated from the increase in mass.

Elemental analysis:

| | | |
|---|---|---|
| C: | 62.15% (calc.) | 61.83% (found) |
| H: | 3.02% (calc.) | 4.10% (found) |
| S: | 0.00% (calc.) | 0.00% (found) |
| N: | 0.00% (calc.) | 0.00% (found) |

Given that dsBr=288.937/w(C)-3.654, a dsBr=102 mol %, corresponding to 1.02 bromine atoms per repeating unit, is obtained.

1H NMR spectrum of br-P3 (external d6-acetone lock, 300 MHz, trifluoromethanesulfonic acid):
6.18 ppm, integrated value 1.37 (Ar—H)
6.40 ppm, integrated value 14.15 (Ar—H)
6.66 ppm, integrated value 1.34 (Ar—H)
7.05 ppm, integrated value 1.25 (Ar—H)
7.21 ppm, integrated value 6.91 (Ar—H)
7.48 ppm, integrated value 1.50 (Ar—H)

Comparison of the signal positions and number of signals in 1H-NMR spectra of br-P3 and P3 shows substitution of both the p-oxyphenoxy rings and the p-oxyphenonyl rings of the repeating unit.

Preparation of the Phosphonic-Acid Polymer pho-P3

10 g of the brominated precursor br-P3 (27.11 mmol of bromine) together with 347.2 mg (2.67 mmol) of anhydrous Ni(II) chloride are placed in a 250 ml three-necked flask provided with stirrer, open air condenser and dropping funnel closed by means of a septum and provided with a nitrogen inlet. The mixture is freed of residual moisture in an oil bath heated to 190° C. by passing a slow stream of nitrogen into it. 30 g of benzophenone are added to the dry mixture under a countercurrent of $N_2$ and the polymer is processed with stirring for 1 hour to give a homogeneous light-beige solution. After the oil bath temperature has been increased to 200° C., 9.98 g (33.49 mmol) of tris(trimethylsilyl) phosphite are introduced into the dropping funnel via the septum and these are added to the mixture over a period of 30 minutes while stirring. About 2 minutes after commencement of the addition, a color change through purple to dark blue is observed and a clear colorless liquid which fumes strongly in air is driven off into a cold trap by the stream of $N_2$. An increasing deepening of the color and an increase in the viscosity become visible over the course of the next 4 hours. The stirrer is switched off and the mixture is heated at 170° C. for 8 hours. After cooling to room temperature, a sample was taken under a countercurrent of $N_2$ and this was freed of benzophenone, residual trimethylsilyl bromide and residual tris(trimethylsilyl) phosphite by treatment with ultrasound and three x 10 ml of absolute isohexane with exclusion of air and moisture. Drying at 100° C. in a stream of $N_2$ gives an emerald green sample, hereinafter referred to as phoSi—P3.

The product is soluble in deuterated DMSO and DMF only with addition of acids such as HBr or trifluoroacetic acid, so that no NMR spectra can be recorded on phoSi—P3. The sample is found to be soluble in warm N-methylpyrrolidone with addition of concentrated HBr to form an emerald green, conspicuously viscous solution. On addition of a few drops of a 1% strength (m/m) Zr(acetylacetonate)$_4$/N-methylpyrrolidone solution, a cheesy, whitish precipitate of Zr(IV) polyphosphonates which is insoluble even in methanesulfonic acid is able to be precipitated. Since P3 and br-P3 are insoluble in N-methylpyrrolidone, comparative testing of the unmodified and brominated polymer is not possible.

The remaining mixture is freed of benzophenone by treatment with ultrasound and 250 ml of a 100:2 (v/v) mixture of methanol/hydrochloric acid and the phosphonic acid is at the same time set free by alcoholytic cleavage of the silyl ester. The compact product is broken up mechanically and Soxhlet extracted with methanol over KOH for 12 hours.

Drying at 75° C. under reduced pressure gives a compact, light-beige material. The product obtained will hereinafter be referred to as pho-P3. A 1H spectrum is recorded in tetramethylsilane-free d6-dimethyl sulfoxide with addition of 2% by volume of trifluoroacetic acid.

| Yield: | 9.4 g |
|---|---|

Determination of the Bromine Content:

Oxidative digestion of pho-P3 with $KNO_3/NaO_2$ and titration with $AgNO_3$ solution and backtitration with FeSCN solution indicates a bromine content below the detection limit of 0.3% by weight.

Thermogravimetric analysis of phoP3 (Netzsch STA 409, heating rate: 10 K/min, air atmosphere):

5% loss in weight at 190° C.
25% loss in weight at 464° C.
35.0% loss in weight at 600° C.

1H-NMR spectrum of pho-P3 (d6-dimethyl sulfoxide+2% by volume of trifluoroacetic acid, 400 MHz):

7.05-7.1 ppm, integrated value 3.1 (Ar—H)
7.35 ppm, integrated value 1.2 (Ar—H)
7.56 ppm, integrated value 1.1 (Ar—H)
7.80-7.92 ppm, integrated value 3.8 (Ar—H)
8.11 ppm, integrated value 1.14 (Ar—H)

31P-NMR spectrum of pho-P3 (d6-dimethyl sulfoxide+ 2% by volume of trifluoro-acetic acid, 400 MHz):

| 14 ppm | (phosphonic acid in strongly acidic environment) |
|---|---|

Example 4

Preparation of a Phosphonic-Acid Poly(Electrolyte) Based on Poly(Sulfone) ULTRASON® S In a 250 ml three-necked flask in an oil bath heated to 70° C., 25 g (56.5 mmol of bisphenol A units) of poly(sulfone) ULTRASON S were dissolved in 100 ml of chloroform by stirring for 20 minutes and reacted with 75 g (94.1 mmol) of bromine in 25 ml of chloroform in the above-described way and worked up.

The product obtained will henceforth be referred to as br-P4.

| Yield: | 34.38 g |
|---|---|

A degree of bromination $ds_{Br}$=210 mol %, corresponding to 2.1 bromine atoms per bisphenol A unit, is calculated from the increase in mass.

Elemental analysis:

| C: | 53.27% (calc.) | 52.18% (found) |
|---|---|---|
| H: | 3.27% (calc.) | 3.20% (found) |
| S: | 5.27% (calc.) | 5.33% (found) |

Given that $ds_{Br}$=410.5943/w(C)-5.6082, it follows that $ds_{Br}$=226 mol %, corresponding to 2.26 bromine atoms per bisphenol A unit.

Preparation of the Phosphonic-Acid Polymer pho-P4.1

5 g of the brominated precursor br-P4 (17.26 mmol of bromine) together with 224 mg (1.73 mmol) of anhydrous nickel(II) chloride, corresponding to 10 mol % based on the bromine content, were reacted with 6.44 g (21.58 mmol) of tris(trimethylsilyl) phosphite in 10 ml of diphenyl ether in the manner described above. A comparable course of the reaction was observed and the products were worked up in the above-described way.

| Yield: | 5.02 g |
|---|---|

Determination of the Bromine Content:
Oxidative digestion of pho-P4.1 with $KNO_3/NaO_2$ and titration with $AgNO_3$ solution and backtitration with FeSCN solution indicated a bromine content below the detection limit of 0.3% by weight.
Determination of the Phosphorus Content:
Oxidative digestion of the sample of pho-P4.1 with $KNO_3/NaO_2$. The average value over three determinations as 8-hydroxyquinolinium molybdophosphate precipitation and gravimetric analysis gives a phosphorus content of 10.98% by weight, corresponding to a degree of functionalization of 219.7 mol % and a Br—P conversion of 97.2% of theory.

Preparation of the Phosphonic-Acid Polymer pho-P4.2

5 g of the brominated precursor br-P4 (17.26 mmol of bromine) together with 112 mg (0.83 mmol) of anhydrous nickel(II) chloride, corresponding to 5 mol % based on the bromine content, were reacted with 6.44 g (21.58 mmol) of tris(trimethylsilyl) phosphite in 10 ml of diphenyl ether in the manner described above. A comparable course of the reaction was observed and the products were worked up in the above-described way.

| Yield: | 5.02 g |
|---|---|

Determination of the Bromine Content:
Oxidative digestion of pho-P4.2 with $KNO_3/NaO_2$ and titration with $AgNO_3$ solution and backtitration with FeSCN solution indicated a bromine content below the detection limit of 0.3% by weight.
Determination of the Phosphorus Content:
Oxidative digestion of the sample of pho-P4.2 with $KNO_3/NaO_2$. The average value over three determinations as 8-hydroxyquinolinium molybdophosphate precipitation and gravimetric analysis gives a phosphorus content of 10.43% by weight, corresponding to a degree of functionalization of 204.7 mol % and a Br—P conversion of 90.6% of theory.

Preparation of the Phosphonic-Acid Polymer pho-P4.3

3 g of the brominated precursor br-P4 (10.92 mmol of bromine) together with 14.1 mg (0.11 mmol) of anhydrous nickel(II) chloride, corresponding to 1 mol % based on the bromine content, were reacted with 4.08 g (13.65 mmol) of tris(trimethylsilyl) phosphite in 6 ml of diphenyl ether in the manner described above. A comparable course of the reaction was observed and the products were worked up in the above-described way.

| Yield: | 3.0 g |
|---|---|

Determination of the Bromine Content:
Oxidative digestion of pho-P4.3 with $KNO_3/NaO_2$ and titration with $AgNO_3$ solution and backtitration with FeSCN solution indicated a bromine content below the detection limit of 0.3% by weight.
Determination of the Phosphorus Content:
Oxidative digestion of the sample of pho-P4.3 with KNO3/NaO2. The average value over three determinations as 8-hydroxyquinolinium molybdophosphate precipitation and gravimetric analysis gives a phosphorus content of 11.1% by weight, corresponding to a degree of functionalization of 217.5 mol % and a Br—P conversion of 96.2% of theory.

The invention claimed is:

1. A halogen-free, oligomeric or polymeric phosphonic acid comprising units of formula (I)

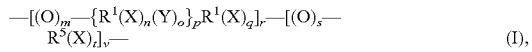

where:

| X | is —P=O(OH)$_2$, |
|---|---|
| Y | is carbonyl or sulfonyl, |
| R$^1$, R$^5$ | are, independently of one another, divalent or polyvalent, substituted or unsubstituted, heteroatom-free aromatic radicals, |
| m, o, s | are each 0, |
| n, q, t | are each, independently of one another, 0 or an integer from 1 to 8, with n and s not simultaneously being 0, |
| r, v | are each, independently of one another, from 0 to 1, with the sum of r and v being from 0.95 to 1.05, and |
| p | is 0 or an integer ≥1, | where the radicals X are substituents on R$^1$ and R$^5$, and R$^1$ and R$^5$ are directly bonded to a phosphorus atom through an aromatic group, wherein repeating units of formula (I) are bonded to one another in the form of a polymer or oligomer chain.

2. A halogen-free mixture comprising:
(A) from 0.1 to 99.9% by weight of one or more compounds according to claim 1 and
(B) from 0.1 to 99.9% by weight of a nitrogen-free solvent having a boiling point of >150° C.

3. A film or composite comprising at least one compound according to claim 1.

4. A polymer blend comprising at least one compound according to claim 1 and at least one further polymer.

5. A membrane comprising at least one compound according to claim 1.

6. A fuel cell comprising the membrane according to claim 5.

7. The fuel cell according to claim 6, wherein the membrane is a selectively permeable membrane in the desalination of water, wastewater purification, dialysis or in ion extraction and retention.

8. A fuel cell comprising at least one compound according to claim 1.

9. A fuel cell comprising at least one polymer blend according to claim 4.

10. A membrane comprising at least one polymer blend according to claim 4.

11. A fuel cell comprising the membrane according to claim 10.

12. The phosphonic acid according to claim 1, wherein p=1 and q=1.

13. The phosphonic acid according to claim 1, wherein n, q and t are >0.

14. The phosphonic acid according to claim 1, wherein R$^1$ is selected from the group consisting of 1,4-phenylene, 1,3-phenylene, 1,2-phenylene, 1,6-naphthylene, 2,4-naphthylene, 3-phenyl-1,4-arylene, 3-alkyl-1,4-arylene, 2-alkyl-1,4-arylene, 2,6-dimethyl-1,4-phenylene, 2,3,5,6-tetramethyl-1,4-phenylene, 4,4'-biphenylene, and 3,3'-diphenyl-4,4'-biphenylene.

15. A process for preparing halogen-free, oligomeric or polymeric phosphonic acids comprising units of formula (I)

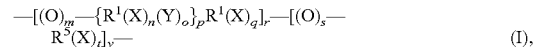

where:

| X | is —P=O(OH)$_2$, |
|---|---|
| Y | is carbonyl or sulfonyl, |
| R$^1$, R$^5$ | are, independently of one another, divalent or polyvalent, substituted or unsubstituted, heteroatom-free aromatic radicals, |
| m, o, s | are each 0, |
| n, q, t | are each, independently of one another, 0 or an integer from 1 to 8, with n and s not simultaneously being 0, |
| r, v | are each, independently of one another, from 0 to 1, with the sum of r and v being from 0.95 to 1.05, and |
| p | is 0 or an integer ≥1, | where the radicals X are substituents on R$^1$ and R$^5$ and R$^1$ and R$^5$ are directly bonded to a phosphorus atom through an aromatic group, wherein repeating units of formula (I) are bonded to one another in the form of a polymer or oligomer chain said process comprises:
(a) reacting oligomeric or polymeric compounds made up of units of formula (II)

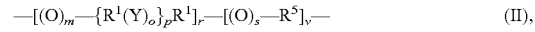

where:

| Y | is carbonyl or sulfonyl, |
|---|---|
| R$^1$, R$^5$ | are, independently of one another, divalent or polyvalent, substituted or unsubstituted, heteroatom-free aromatic radicals, |
| m, o, s | are each 0, |
| r, v | are each, independently of one another, from 0 to 1, with the sum of r and v being from 0.95 to 1.05, and |
| p | is 0 or an integer ≥1, | where the radicals X are substituents on R$^1$ and R$^5$ and the radicals Y are parts of a polymer or oligomer chain, with halogenating agents at a temperature of from —20 to 140° C. in an inert solvent to give haloaromatic oligomeric or polymeric compounds comprising units of formula (III)

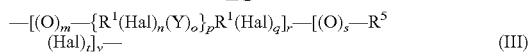
(III)

where $R^1$, $R^5$, Y, m, n, o, p, q, r, s, t and v have the meanings given for the units of formula (I) and Hal is halogen, (b) reacting the haloaromatic, oligomeric or polymeric compounds comprising units of formula (III) obtained in (a) with O-silylated oxygen compounds of trivalent phosphorus in a nitrogen-free solvent or a mixture of nitrogen-free solvents at temperatures above 100° C. in the presence of a catalyst comprising at least one metal of the platinum group of the Periodic Table of the Elements to give oligomeric or polymeric, silylated polyphosphonic acids made up of units of formula (IV)

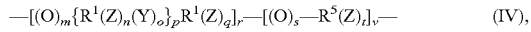 (IV), where $R^1$, $R^5$, Y, m, n, o, p, q, r, s, t and v have the meanings given for the units of formula (I) and Z is $-P(=O)(OSiR^2R^3R^4)(OSiR^6R^7R^8)$, where $R^2$, $R^3$, $R^4$, $R^6$, $R^7$, $R^8$ are, independently of one another, monovalent alkyl, alkenyl, arylaliphatic, cycloaliphatic or heterogroup-comprising alkyl radicals, and (c) reacting the oligomeric or polymeric, silylated phosphonic acids made up of units of formula (IV) obtained in (b) with organic compounds having acidic hydrogen atoms to give halogen-free, oligomeric or polymeric phosphonic acids made up of units of formula (I)

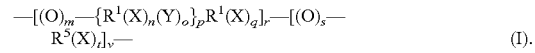 (I).

16. The process according to claim 15, wherein the halogenating agent is a brominating agent.

17. The process according to claim 15, wherein the nitrogen-free solvent is selected from the group consisting of benzophenone, diphenyl ether, diphenyl sulfone and mixtures thereof.

18. The process according to claim 15, wherein the O-silylated oxygen compound of trivalent phosphorus is $HP(OSiR^2R^3R^4)_2$ and/or $P(OSiR^2R^3R^4)_3$.

* * * * *